United States Patent
Huboud Peron (10) Patent No.: US 6,234,889 B1
(45) Date of Patent: May 22, 2001

(54) RAIL CUTTING MACHINE

(75) Inventor: Maurice Huboud Peron, La Tour Du Pin (FR)

(73) Assignee: Societe Turripinoise de Mecanique Stumec, Didier de la Tour (FR)

(*) Notice: Subject to any disclaimer, the term of this patent is extended or adjusted under 35 U.S.C. 154(b) by 0 days.

(21) Appl. No.: 09/200,599

(22) Filed: Nov. 27, 1998

(30) Foreign Application Priority Data

Nov. 27, 1997 (FR) .................................................. 97 14952

(51) Int. Cl.⁷ ...................................................... B24B 19/00
(52) U.S. Cl. ........................... 451/429; 125/12; 125/13.01
(58) Field of Search .................................... 451/429, 342, 451/236, 344, 358, 439; 30/372, 388; 83/743, 745, 698.41, 699.21; 125/12, 13.01, 13.03, 14, 15

(56) References Cited

U.S. PATENT DOCUMENTS

| | | | |
|---|---|---|---|
| 2,214,141 | * 9/1940 | Mall | 451/429 |
| 3,974,596 | * 8/1976 | Huboud-Peron | 451/347 |
| 4,033,074 | * 7/1977 | Lutts | 451/347 |
| 4,068,415 | * 1/1978 | McIlrath | 451/347 |
| 4,156,991 | 6/1979 | McIlrath . | |
| 4,765,098 | * 8/1988 | Duff et al. | 451/429 |
| 5,545,079 | * 8/1996 | Larsson et al. | 451/429 |

FOREIGN PATENT DOCUMENTS 2 267 418   11/1975   (FR) .

* cited by examiner

*Primary Examiner*—Derris H. Banks
(74) *Attorney, Agent, or Firm*—Leydig, Voit & Mayer, Ltd.

(57) ABSTRACT

A rail cutting machine with an engine block rotating a grinding wheel and a support guiding the grinding wheel in its plane transversely of the rail while being pivotally connected onto a vice to be fastened to the rail the grinding wheel being mounted at one end of an an-n pivotally connected with its other end to the engine block about an axis parallel to the pivot axis] on the vice and to the longitudinal axis of the rail, the engine block being permanently connected to the vice so that it may not be turned over horizontally and may not be turned upside down vertically so as to always be on a same side of the plane of the grinding wheel with respect to the vice.

12 Claims, 5 Drawing Sheets

RAIL CUTTING MACHINE

FIELD OF THE INVENTION

The present invention relates to a cutting machine, for example, a cross-cut machine or the like for elongated metal parts, in particular, for rails of a railway.

BACKGROUND OF THE INVENTION

It is necessary when installing a railway track to carry out length adjustments of the rails which will be laid by cutting the rails. Moreover during the repair of a railway track, it is sometimes necessary, if some railway track sections are damaged, to cut out the damaged portions for replacing them with new portions.

The cutting of the rails is carried out with a cutting machine generally comprising a heat engine driving a grinding wheel which will carry out the cutting work.

The subject of the invention is a cutting machine comprising an engine block associated with a grinding wheel rotatably driven thereby and mounted on a support used for guiding in the plane of the grinding wheel and pivoting transversely with respect to the metal part while being pivotally mounted onto a vise intended to be fastened onto the metal part, wherein the grinding wheel is mounted at one end of an arm connected with its other end to the engine block.

An apparatus of this kind was already known in particular from the publication No 2,267,418 of the French patent No 74 12 377 relating to a cutting machine fitted with an engine block and with a support to be fastened onto a rail to be cut through the medium of a vise. The support of the cutting machine consists of two arms having substantially the same length and pivotally connected to each other and, at their other ends, to the cutting machine and to the vise, respectively, at a point located substantially above the rail. These pivotally connected arms provide good guiding of the grinding wheel in a transverse plane perpendicular to the rail to be cut. However the operator is in an uncomfortable working position because the cutting machine is very close to the ground and because he carries the cutting machine while causing it to move with respect to the rail for avoiding stalling the engine, which phenomenon would occur if the grinding wheel remained in a same position with respect to the rail. Since indeed the engine of the cutting machine has limited power, it is necessary that the contact surface between the grinding wheel and the rail be as small as possible to avoid engine labouring and to ensure effective cutting. The operator therefore is in an inconvenient position and in a zone in which he undergoes the harmful effects or nuisances of the smoke of the heat engine and of the sparks which result from the cutting operation. Moreover when the rail has been cut partially on one side thereof, it is necessary to stop the cutting operation, to disconnect the engine block from the pivotally connected arms, removing it from its support, to tilt or swing the support to the other side of the rail, to pivot the engine block by 180° about a vertical axis located in the plane of the grinding wheel and passing through its centre for pivoting the engine block about this vertical axis and to mount again the engine block back onto the pivotally connected arms forming the support on the same initial side thereof in order to be able to carry out the second part of the cutting operation for completing it. Thus during the first phase of the cutting operation, the engine block is located, with respect to the plane of the grinding wheel, on that side of this plane which is opposite to the side where the vise is located and the aforesaid turning up causes the engine block to pass on the other side of the plane, i.e., on the side where the vise is located.

SUMMARY OF THE INVENTION

The object of the invention is to provide a cutting machine for elongated metal parts, in particular for rails, which is more practical and more comfortable or more convenient to be handled or manipulated by the operator by moving him away from the zones of production of smoke of the engine and of generation of sparks and by moving him away from the zone producing vibrations while allowing him to exert a much lesser force for carrying out the cutting operation. Another object of the invention is to provide a cutting machine which permits the complete cross-cutting of a rail without even partial removal of the cutting machine and without turning up the engine block in relation to its support.

To solve this technical problem, in the cutting machine according to the invention the grinding wheel carrying arm is pivotally mounted with one end onto the engine block about a pivot axis parallel to the pivot axis on the vise and to the direction of longitudinal axis of the metal part to be cut across, whereas the engine block is permanently connected to the vise in such a manner that it may not be turned up or over about a substantially vertical axis and may not be reversed or turned upside down about a substantially horizontal axis while always being located on a same side of the plane of the grinding wheel with respect to the vise. For carrying out the cutting of a rail, the operator has thus available a double possibility of movement of the grinding wheel with respect to the rail, on the one hand by pivoting the support of the engine block with respect to the rail and on the other hand by pivoting the grinding wheel with respect to the support of the engine block. The fact that the engine block may not be reversed or turned upside down avoids any possible leakage of fuel and therefore any fire hazard.

According to another feature of the invention, in the working condition or configuration, the longitudinal axis of the drive shaft of the engine block is selectively lying in any present or instantaneous relative angular position, variable between two limiting angles of inclination of 45° on either side of the vertical longitudinal middle plane of the rail. This arrangement avoids any risk of leakage of gasoline through the closure plug or cap of the fuel tank of the engine block and through the carburetor of the engine and accordingly any danger of fire caused by the sparks from the cutting operation.

Advantageously the support of the engine block is connected to the vise by an oscillating arm pivotally connected with one of its ends to the vise about an axis parallel to the axis of rotation for opening and closing the latter and with its other end to the support of the engine block about an axis parallel to the foregoing one, locking means being provided between the oscillating arm and the support of the engine block for rigidly connecting the latter to each other in a selectively unlockable manner in a relative angular position in which the arm forms an acute angle with the support of the engine block.

When the vise in fastened onto the rail, the grinding wheel is located on one side thereof. The grinding wheel may then operate for carrying out the transverse cutting of the rail across the latter over a certain portion of its width. It is then necessary to unlock the oscillating arm and the support of the engine block for disconnecting them from each other for carrying out a movement of raising or lifting the engine block and for passing the grinding wheel to the other side of the rail. Once this motion has been carried out, the oscillating arm and the engine support are locked together and it is possible to proceed with the transverse cutting of the other portion of the width of the rail. This feature is very interesting because it avoids, for carrying out a complete cutting of the rail, having to disconnect the support of the engine block from the vise as this was the case with the cutting machine described for illustrating the state of the art.

According to another feature of the invention, the oscillating arm is pivotally mounted onto the vise by being pivotally connected with one end to the intermediate portion of the vise jaw or chap which is relatively stationary with respect to the rail and is bearing upon the top and upon the underside of the rail head. The other end of the oscillating arm is pivotally connected to the support of the engine block towards one end thereof and the pivot axis of the grinding wheel carrying arm, which is coaxially rigidly connected to the drive shaft, is arranged substantially vertically above the pivot axis on the vise when the cutting machine is at rest.

This arrangement, on the one hand, provides a sufficient clearance for permitting the passage of the grinding wheel from one side to the other of the rail while remaining partially inserted into the cut already provided and, on the other hand, to balance the mass constituted by the engine block just above the rail which thus supports the engine block, thereby facilitating the task of the operator. With the mass being balanced, the operator has not to bear the weight of the cutting machine. The relative angular position of the engine block varies within the aforesaid limits and depends on the present diameter of the grinding wheel disc which decreases with its increasing wear.

According to one embodiment of this cutting machine, the means for locking the support of the engine block onto the oscillating arm includes a hook mounted in a in particular manually displaceable manner for rotation or sliding onto the support of the engine block and intended to hooked onto a stop or abutment made fast to the oscillating arm.

In order to facilitate the movement of lifting of the support of the engine block in relation to the oscillating arm when these two parts are unlocked from each other, at least one spring, such as a gas jack or shift cylinder, is arranged between the oscillating arm and the support of the engine block to open the angle hook formed by these two elements when the locking means are in an inoperative or unlocked position.

In order to facilitate the manipulation of the cutting machine by an operator and to move the operator away from the zone in which is carried out the cutting operation, the support of the engine block is made fast to a lever having a general direction substantially orthogonal to the axis of pivotal connection of the vise to the oscillating arm at the free end of the pivot, a hand-operated control for the acceleration of the motor is mounted and the grinding wheel carrying arm is made fast to a manipulation lever having a general direction substantially orthogonal to the pivot axis of the vise for selective pivoting of the grinding wheel carrying arm about its pivot axis.

The respective lengths of the aforesaid accelerator carrying lever and of the manipulation lever as well as the relative angular position of the accelerator carrying lever in space are such that during the work, the operator assumes a comfortable standing position or upright posture.

Practically, this comfortable attitude of the operator during a cutting period improves, with respect to existing cutting machines, the effectivness of the cutting operation, taking into account the great moment resulting from the length of these levers.

According to another feature of the invention, the vise is made fast to relatively stationary jaw or chap, to a frame at one end of which is arranged a wheel and to other end of which is made fast an oscillating arm forming a handling shaft. Advantageously, the manipulation lever made fast to the grinding wheel carrying arm is selectively connectable rigidly to the frame to form the other handling shaft of the cutting machine in the transport configuration.

This arrangement facilitates the transport of the cutting machine by rolling in the manner of a wheelbarrow between two phases of utilization.

According to still another feature of the invention, to the other end of the frame is made fast a second projecting arm extending substantially at the same level as the first projecting arm, substantially in a vertical plane of the manipulation lever or in the immediate vicinity of this vertical plane while being transversely spaced from the first projecting arm and selectively connectable rigidly to the manipulation lever in a disconnectable manner in a position lower substantially than the level of the first projecting arm and substantially parallel thereto, by means of a lock carried, for example, by the manipulation lever and adapted to co-operate with the free end of the second projecting arm in a position substantially close to the lever.

According to another feature of the invention, the engine drives a shaft coaxial to the axis about which the arm carrying the grinding wheel is pivotally mounted, the end of this shaft, opposite to that driven by the engine, driving the grinding wheel through a transmission, for example, with pulleys and with a toothed belt, accommodated inside of this arm.

The driving by a toothed belt provides a great reliability to the mechanism driving the grinding wheel.

BRIEF DESCRIPTION OF THE DRAWINGS

Figure 1:
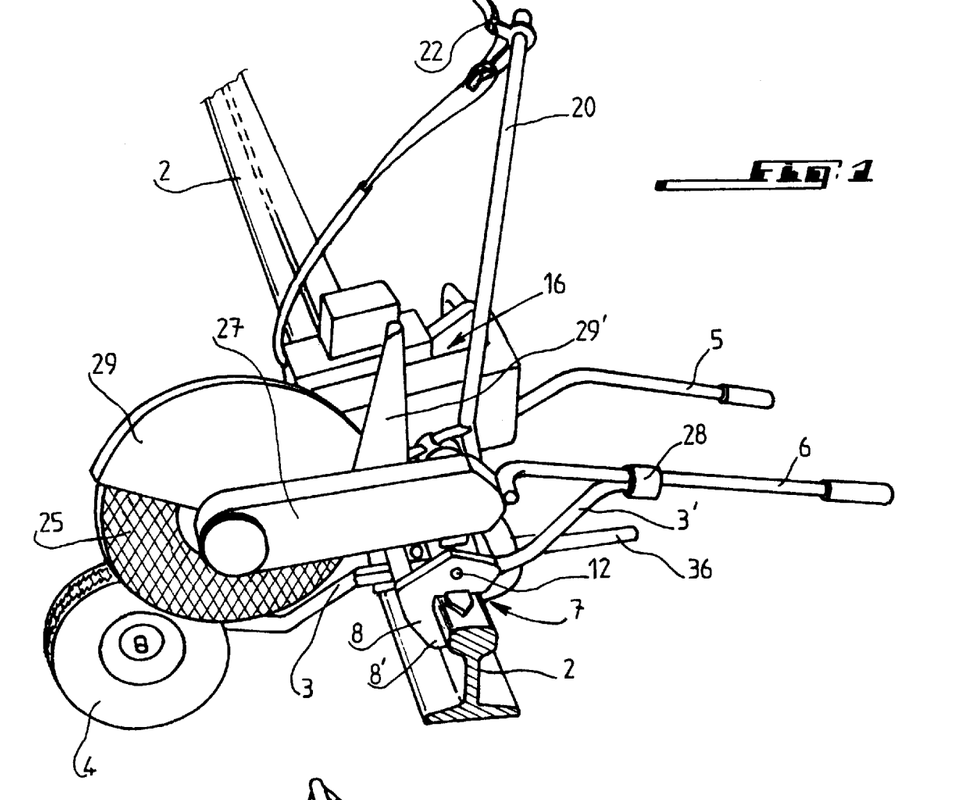
FIG. 1 is a perspective view of the cutting machine according to the invention in its position fastened onto a rail to be cut.

In any case the invention will be better understood and further objects, characterizing features, details and advantages thereof will appear more clearly as the following explanatory description proceeds with reference to the attached diagrammatic drawings given by way of a non-limiting example only, illustrating a presently preferred specific embodiment of the invention and in which:

FIG. 1 shows a perspective view of a cutting machine according to the invention during its putting in place onto a railway rail 2 to be cut.

DETAILED DESCRIPTION

This cutting machine comprises a frame 3 having one end fitted with a wheel 4 and an opposite end made fast to two transversely spaced projecting arms 5 and 3'. The projecting arm 3' is selectively connectable to a pivoting manipulation lever 6 in the inoperative position of this lever, described subsequently. In this coupled configuration, the manipulation lever 6 thus made fast to the frame 3 forms a second handling shaft. Both shafts 5 and 6 have at least their respective free end segments substantially straight and parallel and are provided with operating handles or grips at their free ends to permit the transport of the whole system by rolling on the ground in the manner of a wheelbarrow. The frame carries in its intermediate portion a vise 7 comprising a bent jaw or chap 8 relatively stationary with respect to the rail 2 and a movable bent clamping side jaw or chap 10. The relatively stationary jaw 8 partially embraces the rail head transversely from one side thereof and comprises a side portion forming a jaw 8' surrounding the side of the rail head and bearing from below upon the lower edge thereof as well as an adjacent bearing portion 9 applicable with a substantially flat face upon the top face of the rail head.

The movable clamping jaw 10 is intended to be applied with one jaw-forming portion upon and underneath the lower edge of the rail head on one side thereof and is pivotally connected with its opposite end by means of a pivot pin 12' to the adjacent end of the bearing portion 9 of the relatively stationary jaw 8. The clamping and unclamping movement of the movable jaw 10 in relation to the rail is actuated by an associated hand-operated control preferably of the knuckle-joint or toggle joint type permitting a large opening angle of the movable jaw 10 (i.e. a large angle of spacing with respect to the chap, located opposite thereto, of the relatively stationary jaw 8) as well as a substantial blocking force during the clamping onto the rail and an adjustment permitting the vise 7 to adapt itself to rails with different rail head widths.

Figures 5, 6:
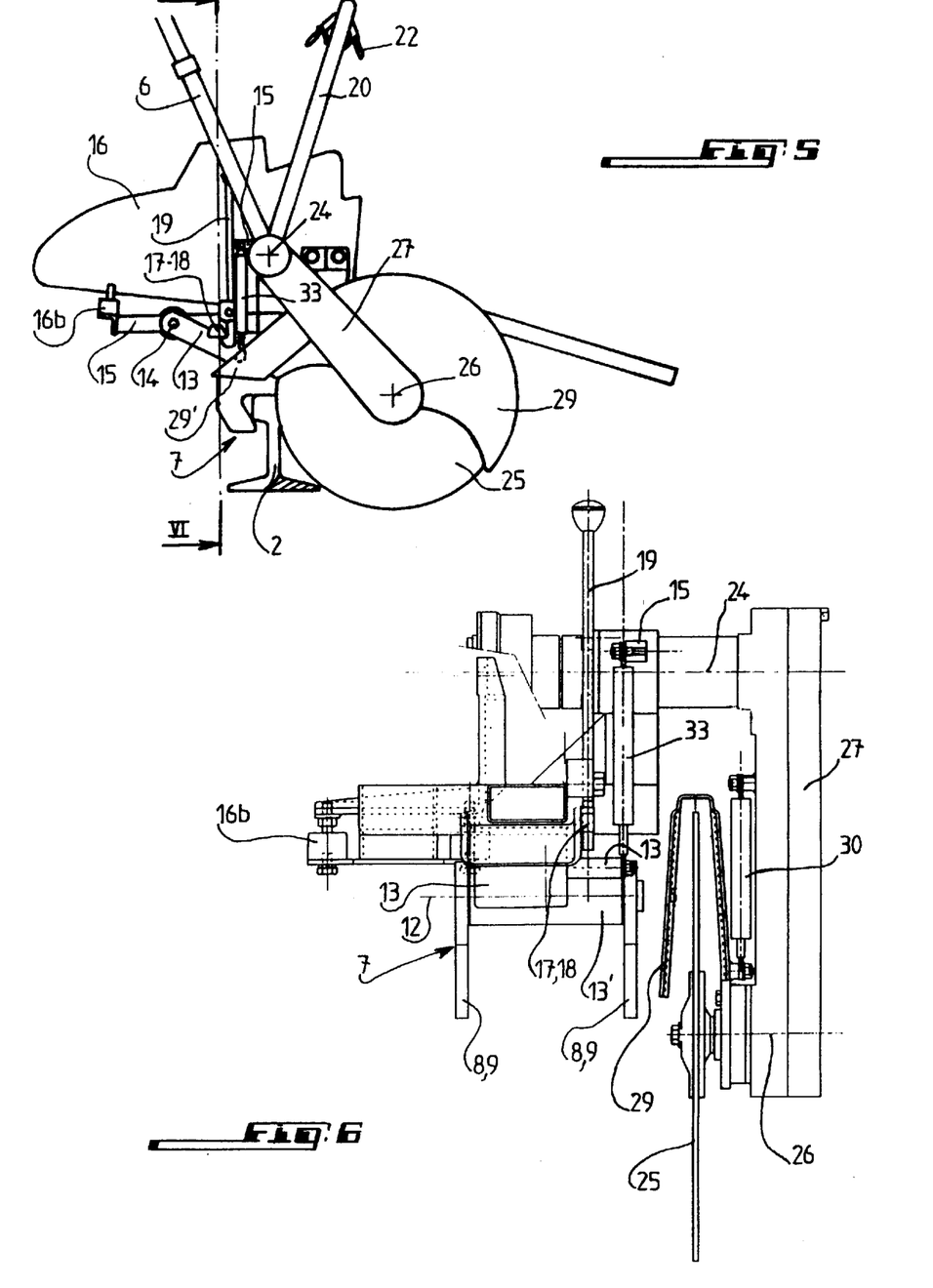
FIG. 6 is a view in cross section taken upon the line VI—VI of FIG. 5, the engine proper having been omitted.

In fact, to permit the rail to be firmly and stably gripped by the vise 7, the latter comprises two relatively stationary, identical or symmetrical and parallel jaws 8 made fast to and spaced from each other and mounted onto the opposite ends, respectively, of an intermediate hub 13' made fast to the oscillating arm 13 pivotally connected to these relatively stationary jaws 8 by the pivot pin 12 as shown in FIG. 6. The movable jaw 10 is also constituted by two movable, identical or symmetrical and parallel jaws made fast to and transversely spaced from each other for being pivotally connected in common relationship with their ends opposite to their jaw, to a projecting end neck portion 9' of the jaw 8 on either side, respectively, of this projecting neck portion by means of a pivot pin or bolt 12'. This projecting neck portion rigidly connects both twin or dual jaws 8 while thus making them fast to each other. Thus the pair of a movable twin jaws 10 is located between both respective parallel planes of both relatively stationary twin jaws 8.

Figure 7:
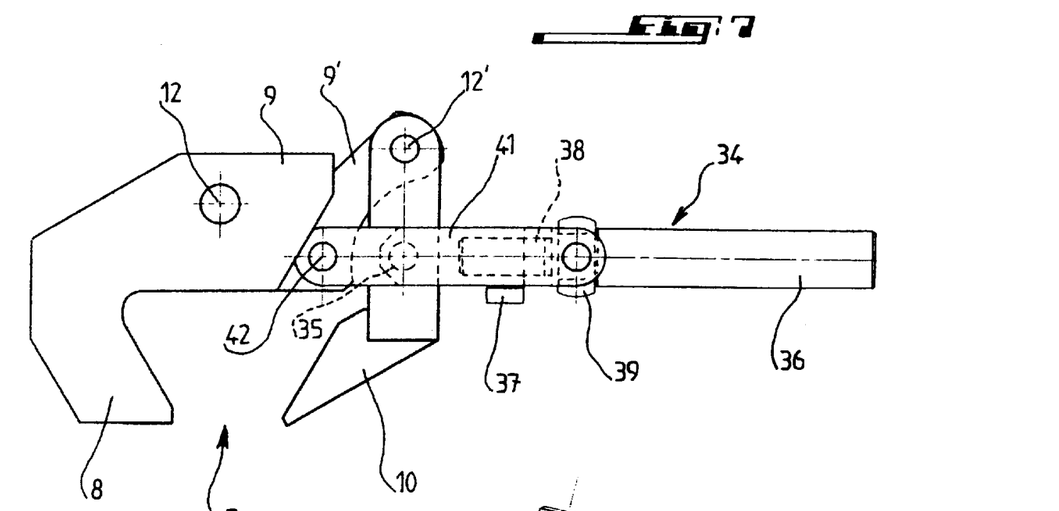
FIG. 7 is an isolated enlarged side view of the vise alone with its hand-operated control in the closed clamping position
Figure 8:
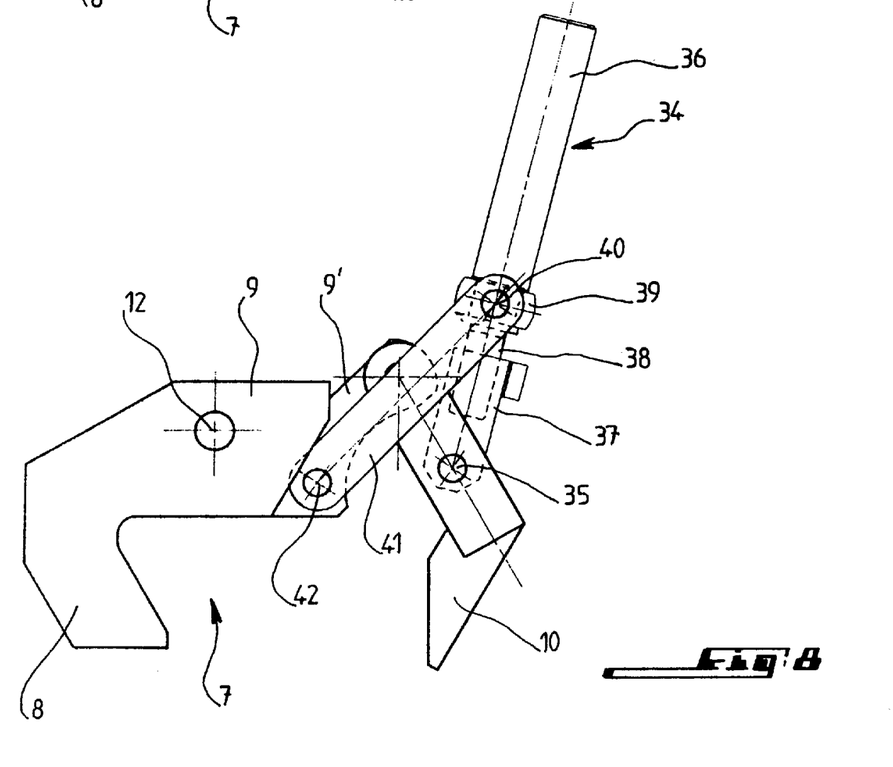
FIG. 8 is a view similar to FIG. 7 but showing the vise and its hand-operated control in the open or unclamped position.

The hand-operated control devise of the vise and in particular of the movable jaw 10 shown on FIGS. 7 and 8 of the drawings comprises a lever 34 pivotally connected at one end by means of a pivot pin 35 to an intermediate point of the movable jaw 10. This lever 34 advantageously consists of the three following elements coaxially aligned in extension of each other: an operating handle or grip 36 provided, at its end opposite to its free end, with a tapped blind hole extending axially; a socket-like piece 37 pivotally connected by means of the pivot pin 35 at its lug-like end to the movable jaw 10 and inserted between both twin elements forming it, this piece being provided at its opposite end with a tapped blind hole extending axially; and a stub shaft 38 forming an intermediate connection between the parts 36 and 37 and consisting of a rod comprising two externally threaded and longitudinally opposite end portions. Between these two threaded portions is an intermediate shouldered collar with a smooth external side bearing surface, both opposite threaded end portions being screwed into the handle 36 and into the piece 37, respectively, until the handle 36 abuts the aforesaid intermediate collar. This stub shaft 38 is more or less deeply screwed into the piece 37 while thus permitting the lever 34 to have a total length variable through selective screwing adjustment for providing a more or less large opening of the jaws of the vise 7, adapted to the width of the rail head to be cut.

Onto the smooth intermediate collar of the aforesaid connecting stub shaft member 38 is mounted, by means of an axial bore with a rotating slide fit, a trunnion member 39 arranged between the terminal face of the end adjacent to the handle 36 and a radially projecting external coaxial annular flange ending the smooth bearing surface of the aforesaid collar towards the socket-like piece 37, so that the step shaft 38 is freely rotatable coaxially in the trunnion member 39, the handle 36 being screwed home onto the corresponding threaded end bearing portion of the stub shaft 38 until abutting the adjacent shoulder defining the aforesaid collar.

The trunnion member 39 is bilaterally provided with two trunnions 40, respectively, coaxially aligned along a transverse direction perpendicular to the longitudinal axis of the aforesaid smooth bore of the trunnion member 39. Two identical parallel twin links 41 are arranged on either side of the projecting neck portion 9' of the relatively stationary jaw 8 and pivotally connected with a one of their ends by means of a pivot pin 42 to an intermediate point of the projecting neck portion opposite end onto the trunnions 40, respectively, of the trunnion member 39 while extending on either side, respectively, of the movable jaw 10 arranged therebetween.

For varying the angle of opening of both jaws of the vise 7, it suffices to vary the length of the lever 34 and, in particular, of the section thereof represented by the distance between axes of the pivot pins 35 and 40. Thus, in order to increase the aforesaid angle of opening, it is necessary to shorten the distance between axes by further screwing the handle 36 into the piece 37 whereas, with a view to decrease this angle of opening, it is necessary to increase this distance between axes by unscrewing the handle 36 from the piece 37. During this screwing and unscrewing operation, the connecting stub shaft member 38 remains practically fast to, for unitary rotation with, the handle 36 and rotates both in the trunnion member 39 through which it extends and in the piece 37. Upon starting from the open or unclamped position of the vise shown on FIG. 8, in order to clamp or close the vise again, it suffices to move the lever 34 downwards for bringing it from the position of FIG. 8 to the position shown on FIG. 7. The lever 34 is, so to say, practically aligned with the links 41, of which the respective longitudinal axes thus are parallel to the own longitudinal axis of the lever 34. To obtain the opening of the vise from its configuration shown on FIG. 7, it suffices to move the lever 36 upwards again.

The structure of the lever 34 may, of course, be different from that which has just been described and shown, since different means may be provided for varying its length at will through a selective adjustment and blocking at the desired length.

Figure 2:
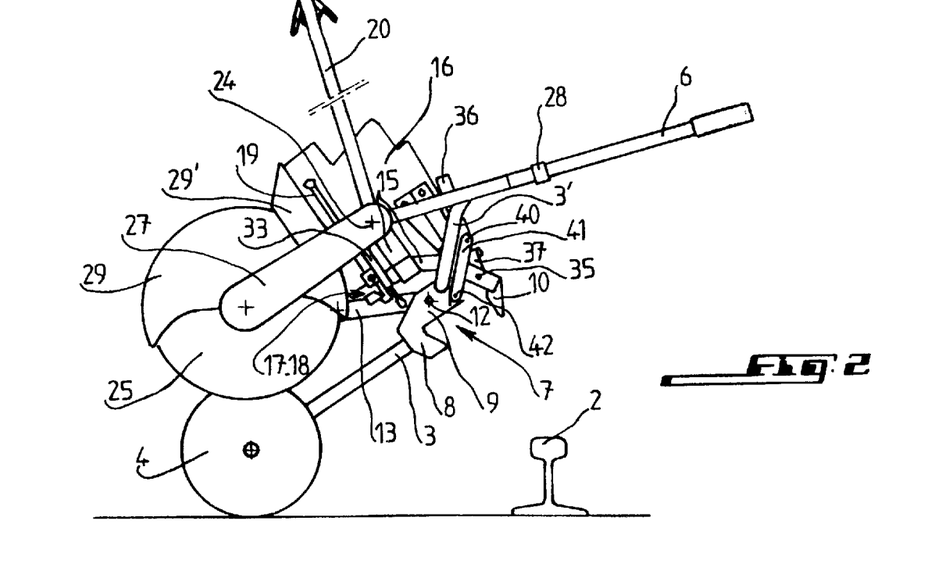
FIG. 2 is a side view of the cutting machine before being fastened onto the rail.

According to the exemplary embodiment shown in particular in FIGS. 1 and 2, the frame 3, to which the jaw 8 of the vise 7 is made fast, is extended beyond the jaw 8 by a rod forming the aforesaid projecting arm 3' made fast with one end to the jaw 8, on the side opposite to the chap thereof and therefore made fast to the frame 3. This advantageously curved or bent rod 3' is selectively connectable rigidly to the manipulation lever 6 and disconnectable therefrom in the substantially mutually contacting configuration of the projecting arm 3' and of the pivoting lever 6 forming then a shaft in its low inoperative position, for example, by means of a sliding collar, sleeve or bushing 28 carried by the shaft 6 and slipped over the free end of the rod 3' in a suitable relative position of the shaft 6 and therefore of the apparatus. The shaft 6 may thus be at will made fast to the frame 3 or disconnected therefrom.

On the central portion 9 of the jaw 8 of the vise 7 is pivotally mounted, about the pivot pin 12 which corresponds to that pivot axis of the vise which is located substantially in the longitudinal vertical middle plane of the rail 2 to be cut in parallel relation to its running surface or tread, the oscillating arm 13 to the other end of which is pivotally connected about a pivot pin 14 parallel to the pivot pin 12, a support 15 for an engine block 16. This engine block, fastened to the support 15 by anti-vibratory suspension bearings 16a and 16b, is not described to the extent it has a known structure. Onto the support 15 is, for example, slidably mounted a lock 17 intended to co-operate with a stop 18 made fast to the oscillating arm 13 in order that the support 15 may be made fast to the oscillating arm 13, locking them to each other. The lock 17, for example, shaped as a hook, may be unlocked by displacement towards a position of disconnection by actuating a hand-operated control lever 19.

The support 15 of the engine block 16 is fitted with a lever 20 which is made fast thereto and has a general direction orthogonal to the pivot axis 12 of the vise 7 and of which the free end is provided with a devise 22 for controlling the speed variation or acceleration of the engine permitting, in particular, adjustment of the running speed of the engine.

The engine drives, through a shaft 24 parallel to the pivot axis 12 of the vise, a grinding wheel 25, the axis 26 of which is offset or shifted with respect to the axis 24. For that purpose, the grinding wheel 25 is mounted at the end of an arm forming a casing 27, this arm being pivotally mounted with respect to the shaft 24 at the end thereof which is opposite that driven by the engine, this arm carrying a drive pulley keyed to the shaft 24 and driving, through a toothed transmission belt accommodated within the said casing, a driven pulley keyed to the shaft of the grinding wheel 25.

Onto the casing or housing 27 forming the grinding wheel carrying arm is fastened the manipulation lever 6 permitting pivoting of the grinding wheel carrying arm 27 during the cutting operation and which, as previously stated, is also usable as a shaft for handling the cutting machine during its non-use. The lever 6 may effectively be disconnected from the rod 3' and therefore from the frame 3 through retraction of the sleeve 28. The grinding wheel 25 is protected on its upper portion by a pivoting housing 29 biassed or acted upon by a spring, preferably a gas jack or gas cylinder 30, of which one end is pivotally connected onto the casing 27 and of which the other end is pivotally connected to a pin made fast to the housing 29 but offset or shifted with respect to the shaft 26 of the grinding wheel 25. This permits automatically bringing the housing into position irrespective of the side on which the grinding wheel 25 is located with respect to the rail 2 to be cut, without any intervention of the operator, by merely bearing upon the rail. There is provided a spark-arresting hood, catch or guard 29' encompassing an exposed portion of the grinding wheel 25 located towards the operator for protecting him against projections of sparks produced during the cutting of the rail.

Figure 3:
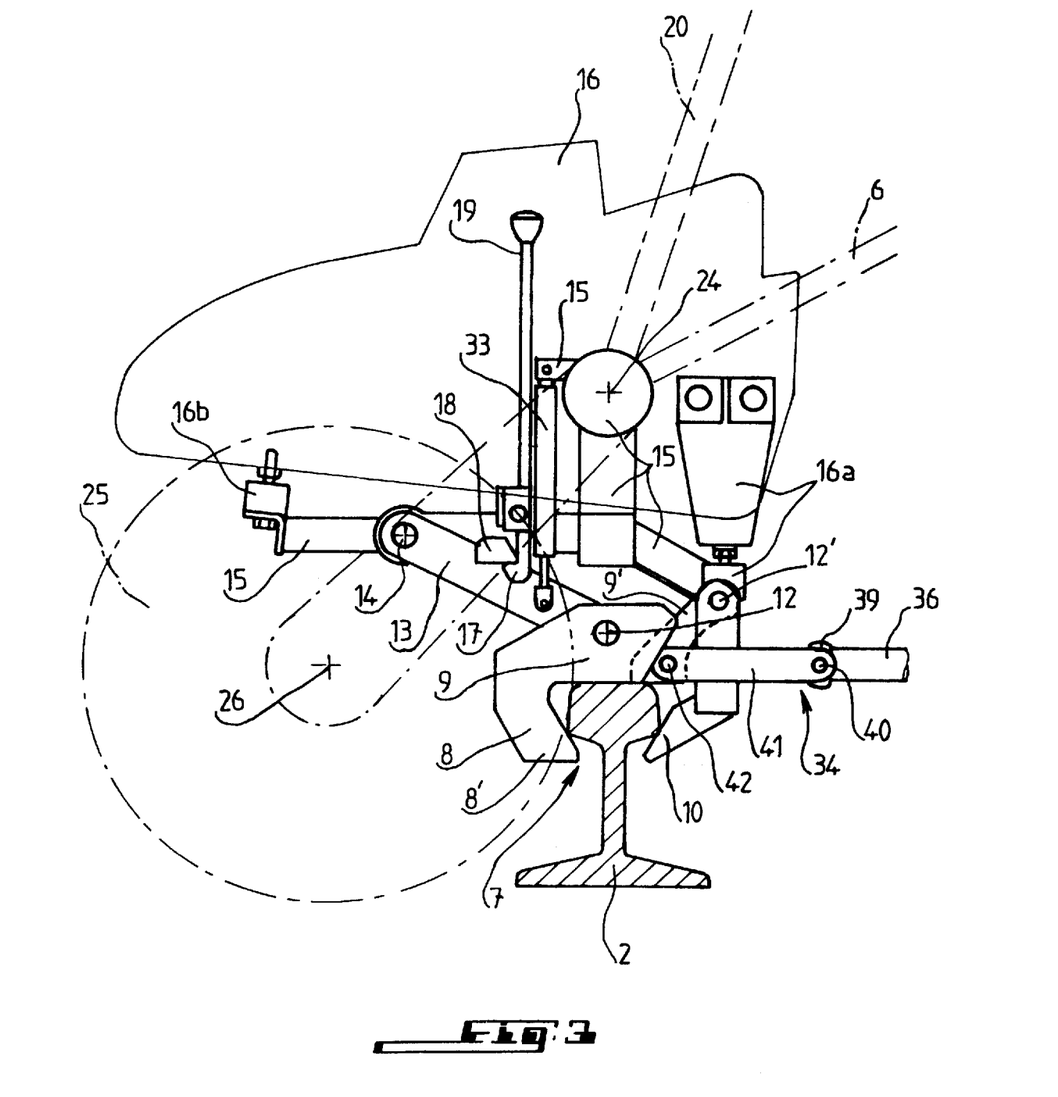
FIGS. 3 to 5 are three side views on a larger scale and partially in section of the cutting machine, illustrating a first phase of cutting on one side of the rail, the passage of the grinding wheel from one side to the other one of the rail and the second phase of cutting completing the cutting of the rail, respectively.
Figure 4:
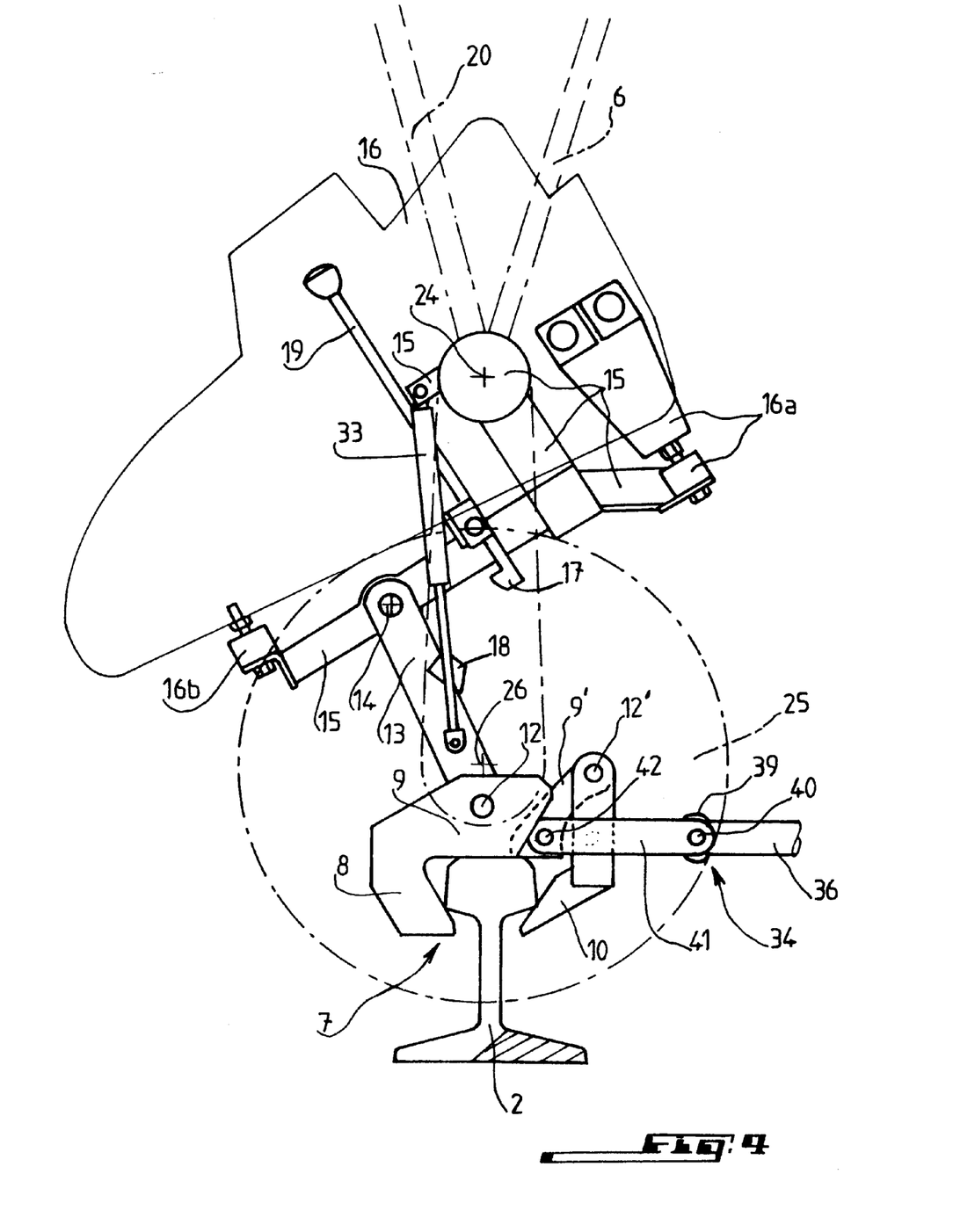

In practice, the apparatus in the transport configuration is brought into the position shown on FIG. 2. It is lowered or moved downwards onto the rail 2 until the jaw 8 of the vise 7 is bearing upon the rail. The vise in then closed by means of the lever 34 and the lever 6 is disconnected from the rod 3' and therefore from the frame 3. The apparatus is in the general position shown on FIG. 3. After having started the engine, it is then possible for the operator to begin the cutting of the rail by exerting a simultaneous and combined action, on the one hand upon, the lever 20 made fast to the support 15 and permitting pivoting of the whole unit consisting of the engine block 16, of the grinding wheel carrying arm 27, of the support 15 and of the projecting arm 13 about the pivot pin 12 on the vise 7 for adjusting or setting the relative angular position of this whole unit in accordance with the extent of wear of the grinding wheel disc 25 and, on the other hand, upon the lever 6 intended to pivot the grinding wheel carrying arm 27 about the pivot shaft 24 for setting or adjusting the relative position of the grinding wheel disc 25 with respect to the rail as well as the advance feed movement of cutting. When the cutting may no longer be carried out on this side, the operator stops the rotation of the grinding wheel and then disconnects the support 15 from the oscillating arm 13 by lifting the lock 17 by means of the lever 19. A spring, preferably a gas jack or gas cylinder 33, arranged between the oscillating arm 13 and the support 15, tends by its expansion to raise the support 15 as well as the engine block 16 as shown on FIG. 4, thereby opening the angle formed between these two unlocked elements, thereby permitting moving of the grinding wheel 25 from one side to the other side of the rail 2 while relieving the corresponding force to be exerted by the operator. When the grinding wheel 25 has been passed on the other side of the rail 2, the support 15 is again locked onto the oscillating arm 13 by means of the devise 17, 18, 19 for assuming the general position shown on FIG. 5. After having put the grinding wheel into operation, the operator, by actuating the levers 20 and 6, may then proceed with the cutting of the second portion of the rail to complete the previous partial cutting thereof and to finish cutting the rail through its whole cross section.

As it appears from the foregoing, the invention brings about a great improvement to the existing technique by providing a cutting machine having a high efficiency, taking into account the double pivotal connection, on the one hand, of the support of the engine block in relation to the vise and, on the other hand of the grinding wheel with respect to the engine block while providing a comfortable and safe working position for the operator and permitting to cut a rail through its whole cross section in one single discontinuous cutting operation without having to disconnect the engine block from the vise and then to make it again fast thereto.

It is obvious that the invention is not limited to the sole form of embodiment of this apparatus described hereinabove by way of example; on the contrary, it covers all the alternative embodiments. Thus, in particular, the frame 3 need not be fitted with a wheel 4 and may not comprise shafts 5 and 6. Also the lever for the actuation of the grinding wheel need not be used as a shaft for the transport of the cutting machine during non-use without departing from the scope of the invention.

What is claimed is:

1. A cutting machine for cutting rails of railway tracks, the cutting machine comprising:

a vise for clamping to a rail of a railway track to cut the rail;

a planar grinding wheel defining a plane;

a support guiding the planar grinding wheel, pivoting transversely with respect to the metal part being cut, and being pivotally connected to the vise;

an engine having an engine block, rotationally driving the planar grinding wheel, and mounted on the support; and an arm having a first end at which the planar grinding wheel is mounted to the engine block, and a second end at which the arm is pivotally mounted to the engine block about a first pivot pin, parallel to a second pivot pin pivotally connected to the vise and, when clamped to the rail to be cut, parallel to a longitudinal substantially horizontal axis of the rail to be cut, the engine block being permanently connected to the vise so that the engine may not be reversed or turned over about a substantially vertical axis when the vise is clamped to the rail to be cut, may not be turned up or upside down about a substantially horizontal axis when the vise is clamped to the rail to be cut, and is always located on a first side of the plane of the planar grinding wheel with respect to the vise.

2. The cutting machine according to claim 1, wherein a drive shaft of the engine block may be in any angular position within 45° on either side of a vertical longitudinally central plane of the rail when the vise is clamped to the rail to be cut.

3. The cutting machine according to claim 1, including an oscillating arm pivotally connected to the vise, wherein the support is connected to the vise by the oscillating arm, the oscillating arm being pivotally connected at a first end to the vise about a first axis parallel to an axis of rotation for opening and for closing the vise, and pivotally connected at a second end to the support about second axis parallel to the first axis, and locking means located between the oscillating arm and the support for selectively locking the oscillating arm and the support in a position in which the oscillating arm forms an acute angle with the support.

4. The cutting machine according to claim 3, wherein the oscillating arm is pivotally connected at the first end to an intermediate portion of a vise jaw that is stationary with respect to the rail to be cut to which the vise is clamped and bearing upon a top and underside of a head of the rail and a pivot axis of a grinding wheel carrying arm, which is coaxially connected to the drive shaft, is substantially perpendicular to an axis of a pivotal connection of the oscillating arm to the vise.

5. The cutting machine according to claim 4, wherein the locking means includes a hook mounted, for hand-operated displacement, on the support for hooking a stop on the oscillating arm.

6. The cutting machine according to claim 5, including at least one spring arranged between the oscillating arm and the support for opening an angle between the oscillating arm and the support when the locking means is unlocked, to reduce force necessary for raising the engine block when moving the planar grinding wheel from one side of the rail to an opposite side of the rail.

7. The cutting machine according to claim 3, including a first lever,
wherein the support is connected to the first lever, which has a direction orthogonal to a pivotal connection of the oscillating arm and the vise, and the first lever has a free end to which is mounted a devise for controlling acceleration of the engine, and a second lever joined to the arm in a direction orthogonal to the pivotal connection of the oscillating arm and the vise for selective pivoting of the arm.

8. The cutting machine according to claim 7, wherein respective lengths of the first lever and the second lever and relative angular position of the first lever permit an operator to assume a standing position when cutting a rail of a railway track.

9. The cutting machine according to claim 7, including a frame, a wheel, and a first projecting arm, wherein the vise is connected at the jaw that is relatively stationary to the frame at a first end of the frame to which the wheel is attached, and a second end of the frame is connected to the first projecting arm, forming a handling shaft.

10. The cutting machine according to claim 9, wherein the second lever is selectively connectable to the frame to form a second handling shaft of the cutting machine for transport of the cutting machine.

11. The cutting machine according to claim 9, wherein the second end of the frame is connected to a second projecting arm extending substantially parallel to the first projecting arm, substantially perpendicular to the second lever, transversely spaced from the first projecting arm and selectively connectable to the second lever by releasing a lock on the second lever and co-operating with a free end of the second projecting arm.

12. The cutting machine according to claim 1, including a transmission connecting the engine to the planar grinding wheel wherein the engine drives a shaft coaxial to an axis about which the arm pivots, an end of the shaft, opposite an end driven by the engine, driving the planar grinding wheel through the transmission, the transmission including a toothed belt accommodated inside of the arm.

* * * * *